Sept. 8, 1931.  B. W. KING  1,822,038
CHECK CONTROLLED SCALE
Filed Jan. 30, 1929   3 Sheets-Sheet 1

INVENTOR.
BERT W. KING
BY
ATTORNEY.

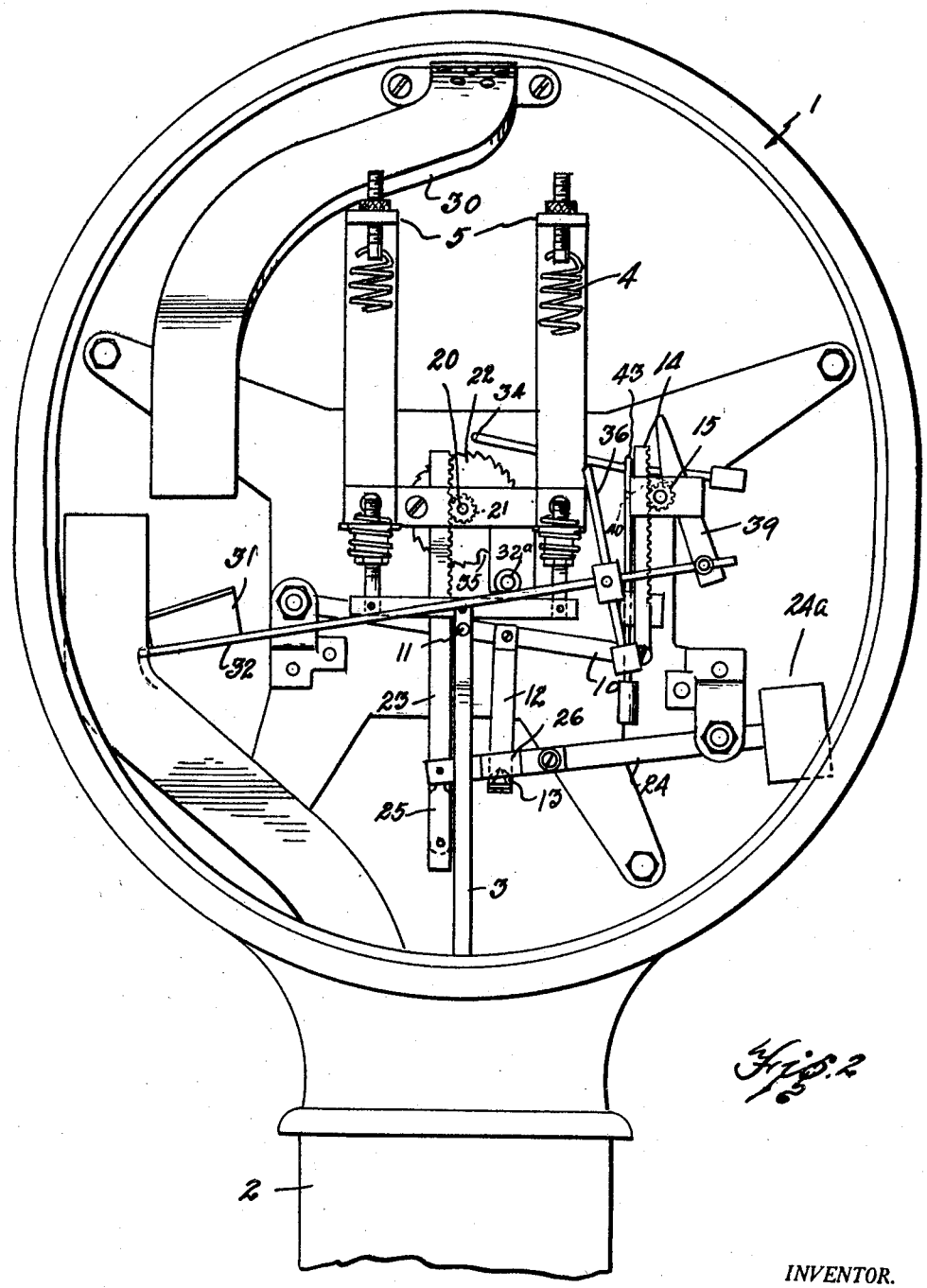

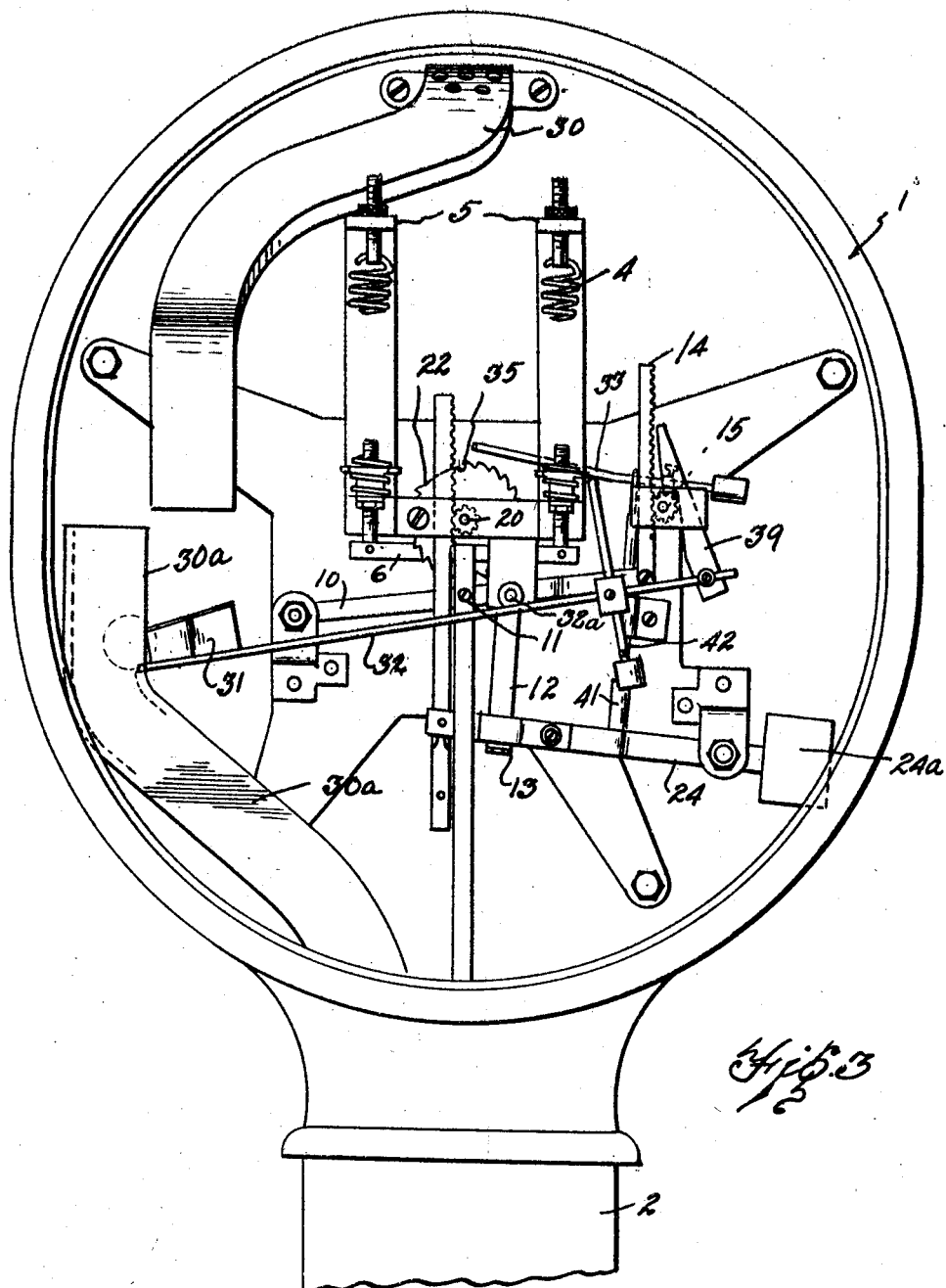

Patented Sept. 8, 1931

1,822,038

UNITED STATES PATENT OFFICE

BERT W. KING, OF DETROIT, MICHIGAN, ASSIGNOR TO BARNES SCALE COMPANY, OF DETROIT, MICHIGAN, A CORPORATION OF MICHIGAN

CHECK CONTROLLED SCALE

Application filed January 30, 1929. Serial No. 336,029.

This invention relates to a check controlled scale with special reference to a scale of the type usually placed in a public place and adapted to be released for weight indication by the insertion of a proper check or coin.

The invention has as its objects the provision of an improved and simplified mechanism designed to release the scale for weight indication by the action of the check or coin inserted in the machine, and designed also to interlock the scale mechanism, once weight indication is had, in a manner to prevent second or repeated weight indications upon the insertion of only a single coin. Moreover, the mechanism involves a minimum number of parts, and these parts are so arranged and constructed as to have a positive action and are not liable to breakage distortion, or otherwise rendered inactive by undue abuse, such as by a person jumping upon the scale platform or the like.

The invention also contemplates a construction of a check controlled scale wherein weight can be ascertained regardless of whether the coin is first inserted or whether the weight is first placed upon the platform. In other words, one desiring to be weighed, need not first step upon the platform, but may first insert the coin, but weighing may be had regardless of which is done first. This aids materially in making the scale fool proof, and requires no skill or thought on the part of the person desiring to be weighed, or to weigh some article.

In the accompanying drawings:

Fig. 2 is a view similar to Fig. 1 illustrating the position of the various parts of the scale, or weighing mechanism, in weighing position, and likewise illustrating the check control devices in the position which they assume at the time of weighing.

Fig. 3 is a view illustrating the position of the parts when a coin has been put into the machine prior to weight having been disposed upon the scale platform.

Figure 1:
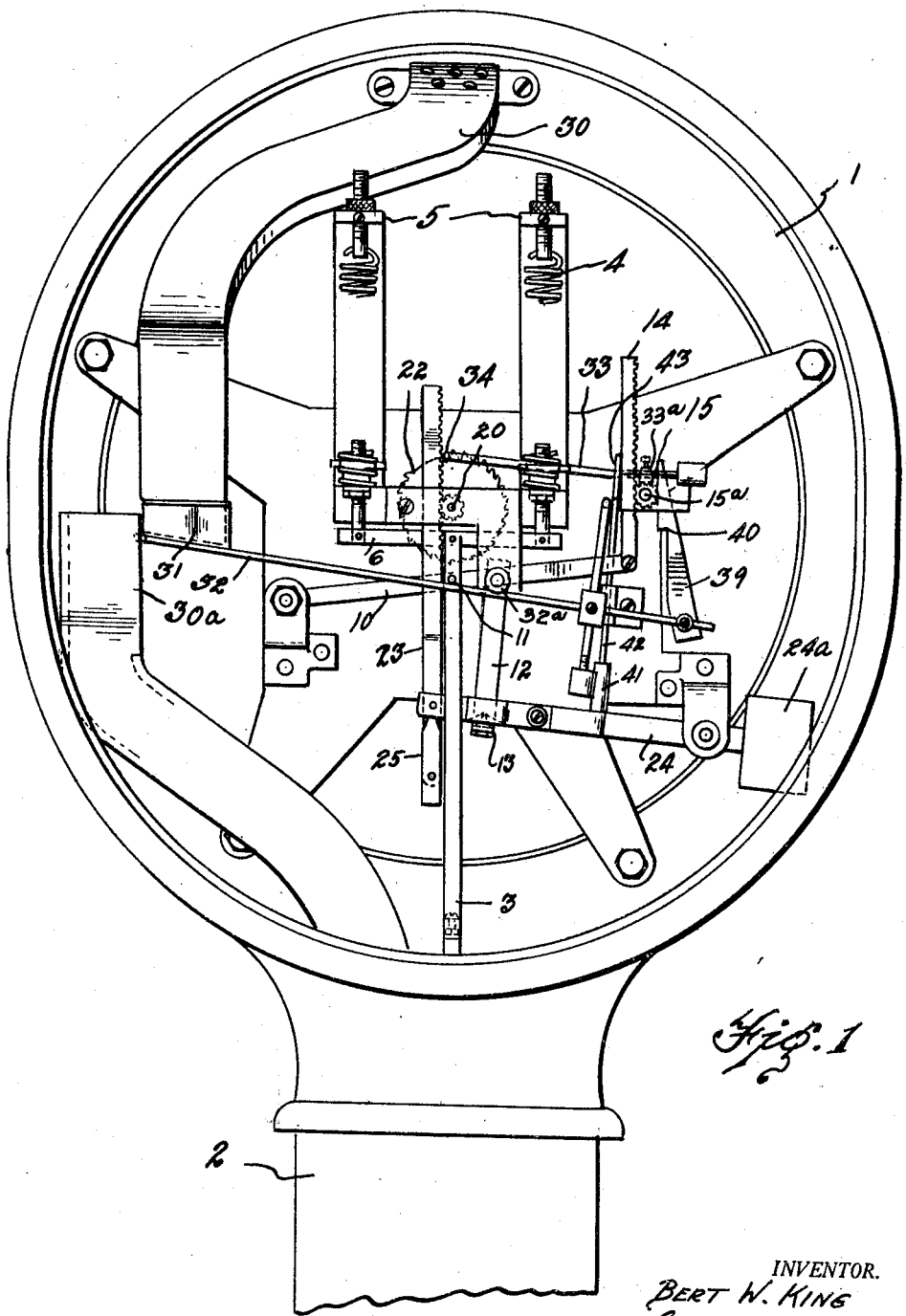
Fig. 1 is a view looking into the rear of the head of a scale, illustrating the parts in the position which they assume when the scale is standing without weight upon the platform.

The head of a conventional scale is shown at 1 and the same is carried by post 2. This post is supported by any suitable scale base (not shown) equipped with a suitable platform together with suitable scale levers (platform and levers not shown) with the levers connected to steelyard 3.

Suitable resisting springs 4 are suspended from brackets 5 and these springs carry a cross-head 6 to which the steelyard 3 is connected. When weight is exerted upon the steelyard 3, as by means of a person or article on the platform of the scale, the steelyard pulls the cross-head 6 down and the springs are distended, this being shown in Fig. 2. The indicating mechanism, however, is not actuated by this movement, in as much as the indicating mechanism is of the follower type and is not released until the insertion of a proper check or coin is deposited.

There is a pivoted arm 10 which is attached operatively to the mechanism just described as by means of being pivotally connected to the steelyard as at 11. This arm is also moved downwardly upon application of weight to the scale. This arm carries a depending member 12 which may be in the form of a loop and this member 12 supports the point 13 of a bearing. Also, pivotally connected with the arm 10 is rack 14 which engages an idler pinion 15, and as the arm 10 and rack 14 move downwardly with the mechanism just described, the pinion 15 is rotated. This pinion plays a part in the check controlled mechanism as will later be described.

The indicating mechanism includes a shaft 20 having secured thereto a pinion 21 and a ratchet wheel 22. The head of the scale is provided with a suitable dial, while a suitable pointer or the like is secured to the shaft 20. The pointer and dial are not shown as these are conventional elements. A rack bar 23 meshes with pinion 21 and a pivoted arm 24 is connected to this rack bar by means of an intermediate link 25. This link takes care of the arcuate movement of the end of the pivoted member 24 while permitting vertical movement of the rack bar 23. The arm 24 carries an inverted bearing 26 designed to cooperate with the bearing 13. This effects a pin and socket bearing.

The pin point bearing 13, being associated with the steelyard, moves downwardly in the first instance upon the application of weight upon the platform scale. The socket 26, however, is associated with the follower mechanism and does not move downwardly until the follower mechanism is released by a check or coin. Accordingly the pin point moves downwardly to a degree determined by the weight applied upon the platform of the scale, and thus it becomes separated from the socket 26. When the follower mechanism, however, is released, the same together with the socket 26 moves down until the socket strikes the pin point 13 whereupon the follower mechanism comes to a stop and in this movement the rack bar 23 has rotated shaft 20 through the pinion 21 and thus the pointer is moved around the dial in the head of the scale.

A suitable chute for receiving a coin or check is shown at 30 and below the open end of the chute is a coin receiving cup 31 mounted upon an arm 32 pivoted as at 32a. The normal position of the cup is shown in Fig. 1, but when a coin falls into the cup its weight rocks the arm 32 to the position shown in Figs. 2 and 3. The movement of this arm releases the weight indicating mechanism. This weight indicating mechanism, however, is normally held from movement by a pivoted member 33 having a hooked end 34 which engages in notch 35 in the ratchet wheel 22. Member 33 is supported by a bracket 33a which in turn is swiveled upon stud 15a which also carries pinion 15.

To release the indicating mechanism, the arm 33 is raised and for this purpose the pivoted arm 32 carries an arm 36 adapted to engage arm 33 and lift the same as indicated in Figs. 2 and 3. Thus, the follower mechanism, as above described, is free to fall by gravity and the rack bar 23 rotates the shaft 20 with the pointer thereon. The arm 24 is suitably counter-balanced by weight 24a to give a nicety of action. The coin, after having rocked the arm 32, is deposited into a second chute 30a as indicated in Fig. 3 and conducted into a suitable tray or the like.

With the coin thus moving out of the cup 31, the lever 32 would by its own weight tend to return to its normal position; in other words, parts are balanced so as to tend to normally move from position shown in Fig. 3 to that of Fig. 1. This, however, would permit arm 33 to drop and lock the weighing mechanism from operating. To prevent this, there is a pivoted dog 39 carried by the arm 32 which is arranged so that it is over-balanced and tends to fall in a counter-clockwise direction. This dog has an engaging part or abutment 40 which moves up over the pinion 15 and engages in the teeth thereof. The arrangement is such that this pinion may readily rotate in a counter-clockwise direction as the follower mechanism of the scale falls by gravity even if the dog is in the position as shown in Figs. 2 and 3.

There is a weight 41 which is suspended, at least part of the time, from the arm 33 as by means of a wire-like connection 42 which is looped as at 43 around the pivoted member 33. This loop is considerably larger than the cross section of the arm 33 so as to form a lost play connection, and the weight 41 in normal position is adapted to rest upon the arm 24 so that its weight is removed from the arm 33 in the normal position of the parts. When the weight 41 rests upon arm 24, is is raised upwardly over what it would be if suspended from arm 33, and this is permitted by reason of the relatively large loop 43. The purpose of this construction will be understood when the operation is described.

In order that the operation may be fully comprehended, reference will be had to Fig. 1 wherein the parts are in normal non-operating position. As heretofore described, a coin may be first inserted or the weight may be first placed upon the platform. Consider that the coin is first inserted; this rocks the arm 32 and other associated parts to the position shown in Fig. 3; the rocking member 33 is lifted thus to release the indicating mechanism and the dog 39 moves upwardly so that the abutment 40 catches upon a tooth in the pinion 15, thus, to hold the parts in the position shown.

The scale mechanism is now free to operate and when weight is applied to the platform, the steelyard 3 is pulled down, the springs are dispended and the follower mechanism moves with the steelyard. In other words, the socket 26 rides down with the pin point 13 and the weight is indicated. In this movement, the rack bar 23 rotates the shaft 20; also the pinion 15 rotates by reason of the downward movement of rack 14, thus creating a sort of pivotal reciprocation of the dog 39 as the teeth of the pinion move past abutment 40.

In the initial lift of the member 33, the weight of the coin was not called upon to raise weight 41 because it was supported by arm 44. Thus, the parts can be very accurately adjusted; when, however, the follower mechanism moves downwardly, the arm 24 moves out from under weight 41 and thus the weight is suspended from arm 33. Engagement of the dog 39 and pinion 15, however readily hold the arm and weight in raised position.

As soon as some weight is released from the platform, it is desirable to again lock the indicating mechanism to prevent repeated weight indication. As the weight is partially released, the springs 4 of course, pull the steelyard upwardly and the point bearing 13 moves upwardly, thus, carrying with it the follower mechanism. At this time, the rack bar 14 rotates pinion 15 in a clockwise direction, thus the abutment 40 of the dog 39 is released whereupon the weight of the parts cause a rocking of the arm 32 in a clockwise direction back to their normal position. At the same time the part 34 of arm 33 engages the ratchet wheel 22. This is assured because of the weight 41 which hangs upon the arm 33. Thus, even though weight is again applied to the platform, the indicating mechanism will not function because the ratchet wheel 22 is held from movement by the arm 33. However, when the weight is entirely released, the ratchet wheel can move in a clockwise direction as regards the catch 34 so as to go back to normal position.

Thus, the operation of this mechanism, when the coin is first inserted in the scale, is made clear. Supposing, however, that an operator first gets upon the platform; this pulls down the steelyard to the position shown in Fig. 3 and the point 13 moves downwardly away from the socket 26. The weight indication cannot be had because the ratchet wheel is locked by the end of the arm 33. A check or coin is now inserted and the cup 31 is pushed downwardly with a rocking of arm 32, and thus, the parts associated with arm 32 take the position illustrated in Fig. 3. The arm 33 releases the ratchet wheel whereupon the rack 23 moves down, the ratchet wheel being free to rotate, and weight indication is had. The locking mechanism for locking against repeated weighing indications now operates, when weight is partially released in the manner identical to that described; in brief this is a rotation of pinion 15 in clockwise direction, thus, releasing dog 39 and permitting arm 33 to engage the ratchet wheel.

Claims:

1. The combination with a scale mechanism movable in the first instance by a load upon the scale, and a follower mechanism for indicating such movement, of a rack and pinion associated with the follower mechanism, coin actuated means comprising a catch adapted to be held in actuated position by the said pinion, means associated with the coin actuating means for locking and unlocking the follower mechanism, said pinion and catch device being arranged so that rotative movement of the pinion upon relief of the load effects release of the catch whereby the coin actuated means actuates to lock the follower mechanism.

2. The combination with a scale having an indicating mechanism including a ratchet wheel, a locking member associated with the ratchet wheel, a movable arm arranged to be actuated by a coin, and associated with the locking member to unlock the same in such movement, a pinion, a catch on the movable member for cooperating with the pinion, means for rotating the pinion upon scale actuation by a load in a direction to retain the catch on the pinion, whereby, to hold the coin movable means in position to retain the ratchet wheel unlocked, said means rotating the pinion in the opposite direction upon relief of the load upon the scale, whereby said lock again engages the ratchet wheel.

3. In a coin controlled scale, the combination of a scale mechanism including a ratchet wheel, a movable arm normally engaging the ratchet wheel to prevent scale operation, means actuated by a coin for releasing said arm, a weight suspended from said arm for insuring its engagement with the ratchet wheel, and means normally supporting the weight so that the same is free of said arm when the scale is inoperative, whereby the coin controlled means actuates said arm independently of the weight.

4. In a coin controlled scale, the combination of a scale mechanism including a ratchet wheel, a pivoted arm for engaging the ratchet wheel to lock the scale mechanism against operation, a weight suspended from said arm, a lever in the scale mechanism normally lifting the weight free of the arm when the same is in engagement with the ratchet wheel, and coin controlled means for lifting said arm thus permitting movement of the scale lever, whereby the weight is supported by said arm and insures engagement of the same with the ratchet wheel when released by the coin controlled means.

In testimony whereof I affix my signature.
BERT W. KING.